C. I. MANEE.
AUXILIARY WHEEL.
APPLICATION FILED JUNE 28, 1912.

1,064,755.

Patented June 17, 1913.

WITNESSES
G. E. Sterritte
Eugene Taxer

INVENTOR
Charles I. Manee
BY
Anton Phelps Marr
ATTORNEY

UNITED STATES PATENT OFFICE.

CHARLES I. MANEE, OF NEW YORK, N. Y.

AUXILIARY WHEEL.

1,064,755.  Specification of Letters Patent.  Patented June 17, 1913.

Application filed June 28, 1912. Serial No. 706,341.

*To all whom it may concern:*

Be it known that I, CHARLES I. MANEE, a citizen of the United States, and resident of the borough of Manhattan, city, county, and State of New York, have invented certain new and useful Improvements in Auxiliary Wheels, of which the following is a specification.

This device is intended to be used as an auxiliary wheel to be carried upon the running board or other convenient portion of an automobile, and to be ready for instant attachment to the hub of anyone of usual four wheels that support the vehicle.

I have constructed my device without a hub or bearings as it will not ever be called upon to serve where a standard wheel is not provided. The rim though supports a tire which it is my intention will be kept fully inflated and ready for instant use.

The detail of construction and the advantages to be gained thereby will be fully set forth as the specification progresses.

The following is what I consider the best means of carrying out this invention.

Figure 1:
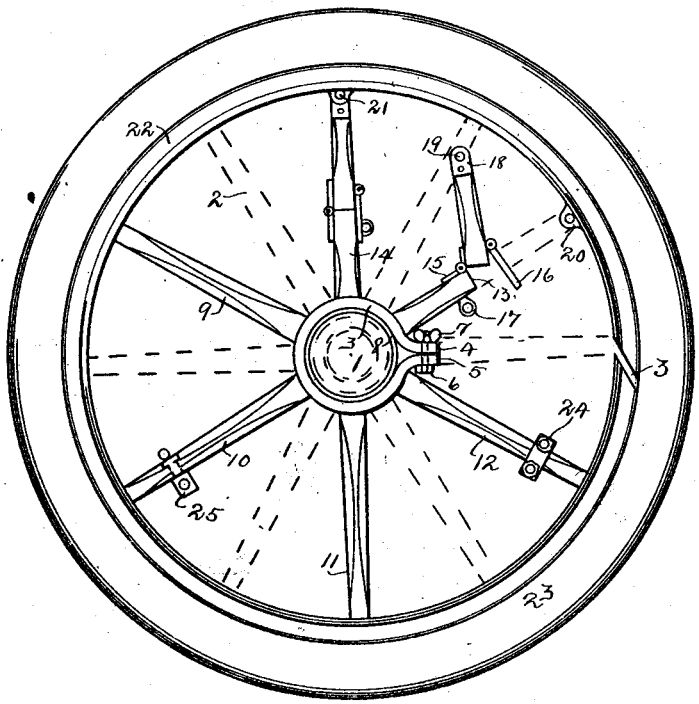
Figure 2:
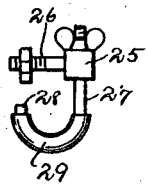

The accompanying drawings form a part of this specification, in which:

Figure 1 shows in elevation my auxiliary wheel and the dotted lines show an ordinary wheel to which my device is attached. Fig. 2 shows on a larger scale one of the clamping means.

Similar reference numerals indicate like parts in all the figures where they appear.

In dotted lines in Fig. 1, I have shown a wheel of ordinary construction provided with a hub 1, and a plurality of spokes 2 radiating outward therefrom. Secured about the hub is a member 3, which may be a band of steel and which should be tempered so as to be slightly springy. This band 3 is not a complete ring but the ends 4 and 5 are turned outward so as to produce lugs through which a bolt 6 may pass. A wing-nut 7 upon the bolt 6 serves as a means for securing the band and for closing it to a greater or less extent upon the hub 3. I may, if I find it desirable secure a strip 8 of leather or other soft material upon the inner face of the band 3, so that the hub 1 or the outer surface thereof will not be bruised by the addition of my device.

Secured to and radiating from the band 3, I have arranged a plurality of spokes 9, 10, 11, 12, 13, and 14. The spokes 9, 10, 11, and 12 are similar in all respects and may be solid spokes of wood, more or less artistically turned and secured in the ordinary manner to the band 3. The spokes 13 and 14 are of different construction than the others, each being divided at a point between the ends so as to produce two parts. A hinge 15 secures the parts together for a purpose that shall appear later and a hasp co-acting with the eye 17 secures the two parts firmly together and in alinement.

The outer end of the spoke is provided with a metallic member 18, which is perforated at 19, and a lug 20, similarly perforated receives the member 18 in close engagement. A bolt 21 may then be passed through the lug and the member 18 securing the spokes in position.

A rim 22 extends around outside of all of the spokes and to this rim the spokes 9, 10, 11, and 12 are secured in the ordinary manner. The lugs 20 are formed integral with or firmly secured to the rim and the spokes 13 and 14 are secured into the lugs in the manner already set forth. This rim 22 is of ordinary construction except that the ends are not joined together to complete a ring. The adjacent ends are each cut at an angle so that when brought together each will overlap the other to no little extent. I have found this construction desirable as it is of assistance in removing or replacing the tire.

A tire 23 of ordinary construction may be fitted to the rim and inflated and my device will then be ready for operation. To use the device the wheel having the injured tire is jacked up or raised from the ground, the wing-nut 7 is then loosened allowing the band 3 to expand, this band is then placed over the hub 1 of the wheel and the wing-nut 7 is again tightened causing the band 3 to clamp securely upon the hub. My auxiliary wheel may be depended upon to operate in this condition but I do not usually care to trust to the frictional engagement 3, with the hub. I have therefore provided other means for securing my wheel in position, these means may consist of an ordinary shackle 24, but I prefer to use the adjustable hook shown in detail in Fig. 2. This hook comprises a block 25 provided with a stud 26 which passes through the spoke, and upon which the block 25 is free to pivot. Extending transversely through the block 25 is a second screw-threaded stud 27 which is provided with a hook 28, and which is adapted to engage with one of the spokes of the wheel. To protect the spoke against a disfiguring mark, which might be occasioned by the hook 28, I may place a short length of rubber tubing or other desirable protective material about the hook 28 as shown at 29. It will be noted that my auxiliary wheel has but half the number of spokes of an ordinary wheel, and as it is intended for temporary use only I have found this to be sufficient, and as this construction makes the device much lighter and easier of manipulation I have found it to be highly satisfactory.

The wheel now being complete it is desirable to place a tire thereon, and I accomplish this by drawing the bolts 21, and releasing both of the hasps 16 allowing the outer ends of the spokes 13 and 14 to be folded back. The tire may then be arranged upon that part of the rim adjacent to the spokes 9, 10, 11, and 12 and may then be passed over the remainder of the rim by compressing the rim and closing the otherwise open slit 30. When the tire is in place and before it is inflated the outer ends of the spokes 13 and 14 are returned to their operative position with the hasps locked in place and the bolts 21 in position. Inflating the tire will then cause it to tighten the whole structure and the device is ready to serve as an auxiliary tire whenever it may be required.

Modifications may be made within the scope of the appended claims without departing from the principle or sacrificing the advantages of this invention.

It is obvious that three or more of the spokes may be severed and hingedly connected, and it is obvious that I may use another securing means than those shown at 24 and 25. Other changes may be made by a good mechanic.

Having carefully and fully described my invention what I claim and desire to secure by Letters Patent is:—

1. A device of the character described comprising a hollow and slitted hub and a rim, a plurality of solid spokes between said hub and said rim and a plurality of articulated spokes between said hub and said rim as specified.

2. An auxiliary wheel comprising a slitted ring having its ends out-turned, an obliquely slitted ring of larger diameter, and a plurality of articulated spokes between said rings and adapted to forcibly retain said rings predetermined distances apart as herein specified and for the purpose set forth.

Signed at New York city, in the county of New York and State of New York this 19 day of June 1912.

CHARLES I. MANEE.

Witnesses:
G. E. STERRITTE,
ARTHUR PHELPS MARR.